(12) United States Patent
Boyd et al.

(10) Patent No.: US 10,189,405 B2
(45) Date of Patent: Jan. 29, 2019

(54) VEHICULAR MULTI-PURPOSE WARNING HEAD-UP DISPLAY

(71) Applicant: Yazaki North America, Inc., Canton, MI (US)

(72) Inventors: Michael Boyd, Saline, MI (US); Ching Fong, Ann Arbor, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 14/995,447

(22) Filed: Jan. 14, 2016

(65) Prior Publication Data

US 2016/0200249 A1 Jul. 14, 2016

Related U.S. Application Data

(60) Provisional application No. 62/103,380, filed on Jan. 14, 2015.

(51) Int. Cl.
*B60Q 9/00* (2006.01)
*G02B 27/01* (2006.01)
*B60R 1/00* (2006.01)
*B60K 37/02* (2006.01)

(52) U.S. Cl.
CPC ............... *B60Q 9/00* (2013.01); *B60K 37/02* (2013.01); *G02B 27/0101* (2013.01); *G02B 2027/0112* (2013.01); *G02B 2027/0141* (2013.01)

(58) Field of Classification Search
None
See application file for complete search history.

(56) References Cited

U.S. PATENT DOCUMENTS

| | | | |
|---|---|---|---|
| 4,613,200 A | 9/1986 | Hartman | |
| 4,998,784 A | 3/1991 | Freeman et al. | |
| 5,414,439 A | 5/1995 | Groves et al. | |
| 6,373,378 B1 * | 4/2002 | Ewerhart | B60Q 1/085 340/425.5 |
| 6,720,938 B2 * | 4/2004 | Ohkawara | G09G 5/00 340/903 |
| 7,095,562 B1 | 8/2006 | Peng et al. | |
| 7,315,241 B1 * | 1/2008 | Daily | G02B 27/01 340/332 |
| 7,605,773 B2 | 10/2009 | Janssen | |
| 7,817,022 B2 * | 10/2010 | Uematsu | B60K 35/00 340/426.32 |
| 7,932,960 B1 | 4/2011 | Fong | |

(Continued)

FOREIGN PATENT DOCUMENTS

| | | | |
|---|---|---|---|
| DE | 10131720 A1 | 1/2003 | |
| EP | 1992979 A1 | 11/2008 | |
| WO | WO 9815845 A1 * | 4/1998 | ........... G01S 13/931 |

*Primary Examiner* — Chico A Foxx
(74) *Attorney, Agent, or Firm* — Foley & Lardner LLP

(57) ABSTRACT

A vehicle head-up display device includes a display control module that receives signals from a plurality of sources and determines one or more warnings based on the signals. The warnings may include at least one of a lane departure warning, a blind spot warning, a front/following/backup distance indicator, a head-on threat warning, and a lateral threat warning. A display module has a plurality of light sources that selectively project a plurality of light patterns onto a plurality of locations on a windshield of a vehicle such that the plurality of light patterns are superimposed on objects outside of the vehicle.

23 Claims, 13 Drawing Sheets

(56) References Cited

U.S. PATENT DOCUMENTS

| | | | |
|---|---|---|---|
| 8,150,581 B2* | 4/2012 | Iwazaki | B62D 1/28 701/42 |
| 8,275,497 B2* | 9/2012 | Koch-Groeber | B60K 35/00 188/72.1 |
| 8,421,710 B2 | 4/2013 | Nakamura et al. | |
| 8,514,099 B2 | 8/2013 | Seder et al. | |
| 8,629,784 B2* | 1/2014 | Szczerba | G01S 13/723 340/438 |
| 8,686,872 B2 | 4/2014 | Szczerba et al. | |
| 8,810,381 B2* | 8/2014 | Fong | B60Q 9/008 340/435 |
| 9,014,904 B2* | 4/2015 | Higgins-Luthman | H04N 5/23229 382/104 |
| 9,269,263 B2* | 2/2016 | Gieseke | G08G 1/04 |
| 9,457,754 B1* | 10/2016 | Christensen | B60Q 1/525 |
| 9,588,340 B2* | 3/2017 | Ng-Thow-Hing | G02B 27/01 |
| 2005/0259033 A1* | 11/2005 | Levine | B60K 26/00 345/7 |
| 2005/0273262 A1* | 12/2005 | Kawakami | B62D 15/025 701/301 |
| 2006/0227036 A1* | 10/2006 | Blaskovich | G01S 7/12 342/29 |
| 2007/0115105 A1* | 5/2007 | Schmitz | B60K 31/047 340/439 |
| 2008/0077882 A1* | 3/2008 | Kramer | B60K 35/00 715/810 |
| 2008/0243312 A1* | 10/2008 | Nakamura | G01C 21/26 701/1 |
| 2009/0022423 A1* | 1/2009 | Ehlgen | B60R 1/00 382/284 |
| 2009/0067057 A1* | 3/2009 | Sprague | G02B 27/0101 359/630 |
| 2009/0231116 A1* | 9/2009 | Takahashi | B60K 35/00 340/461 |
| 2010/0014714 A1* | 1/2010 | Zhang | G06K 9/00798 382/104 |
| 2010/0141414 A1* | 6/2010 | Matsumoto | B60Q 9/007 340/435 |
| 2010/0182140 A1* | 7/2010 | Kohno | B60K 35/00 340/438 |
| 2010/0265048 A1* | 10/2010 | Lu | B60Q 9/005 340/435 |
| 2011/0313665 A1* | 12/2011 | Lueke | G01S 13/931 701/301 |
| 2012/0123613 A1* | 5/2012 | Waki | G08G 1/167 701/1 |
| 2012/0133738 A1* | 5/2012 | Hoffmeier | G08G 1/164 348/46 |
| 2012/0154591 A1* | 6/2012 | Baur | B60R 1/00 348/148 |
| 2012/0249794 A1* | 10/2012 | Kiyo | B60R 1/00 348/148 |
| 2012/0268262 A1* | 10/2012 | Popovic | B60Q 9/008 340/438 |
| 2012/0306637 A1* | 12/2012 | McGough | B60K 37/06 340/439 |
| 2013/0057397 A1* | 3/2013 | Cutler | B62D 15/0255 340/435 |
| 2013/0222935 A1* | 8/2013 | Furlow, Jr. | B60R 1/081 359/868 |
| 2013/0311075 A1* | 11/2013 | Tran | B60W 30/09 701/117 |
| 2013/0328942 A1 | 12/2013 | Chen | |
| 2013/0342338 A1* | 12/2013 | Green | B60W 50/14 340/438 |
| 2014/0002252 A1* | 1/2014 | Fong | B60Q 9/008 340/435 |
| 2014/0070934 A1* | 3/2014 | Chau | B60R 1/00 340/438 |
| 2014/0211319 A1 | 7/2014 | Park et al. | |
| 2014/0218268 A1 | 8/2014 | Olesen et al. | |
| 2015/0203030 A1* | 7/2015 | Knobl | B60Q 9/00 340/438 |
| 2016/0297365 A1* | 10/2016 | Nix | B60R 1/002 |

* cited by examiner

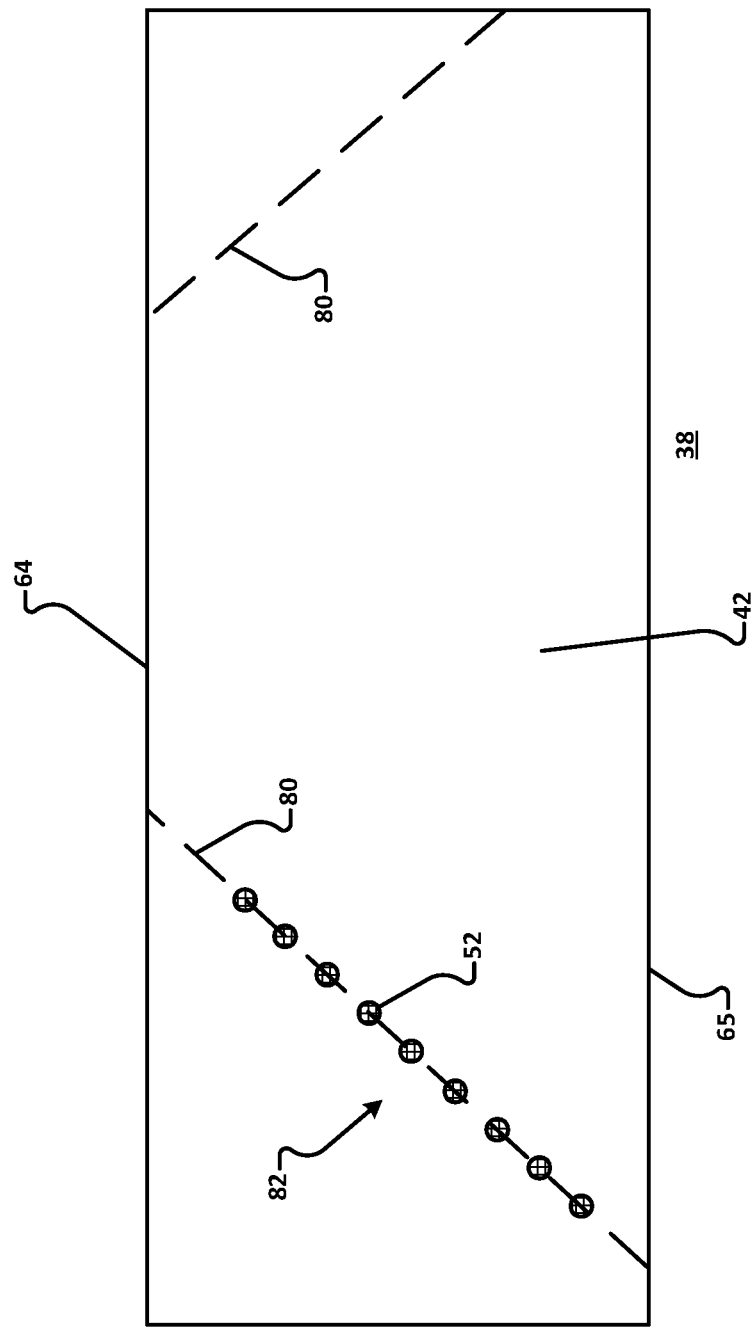

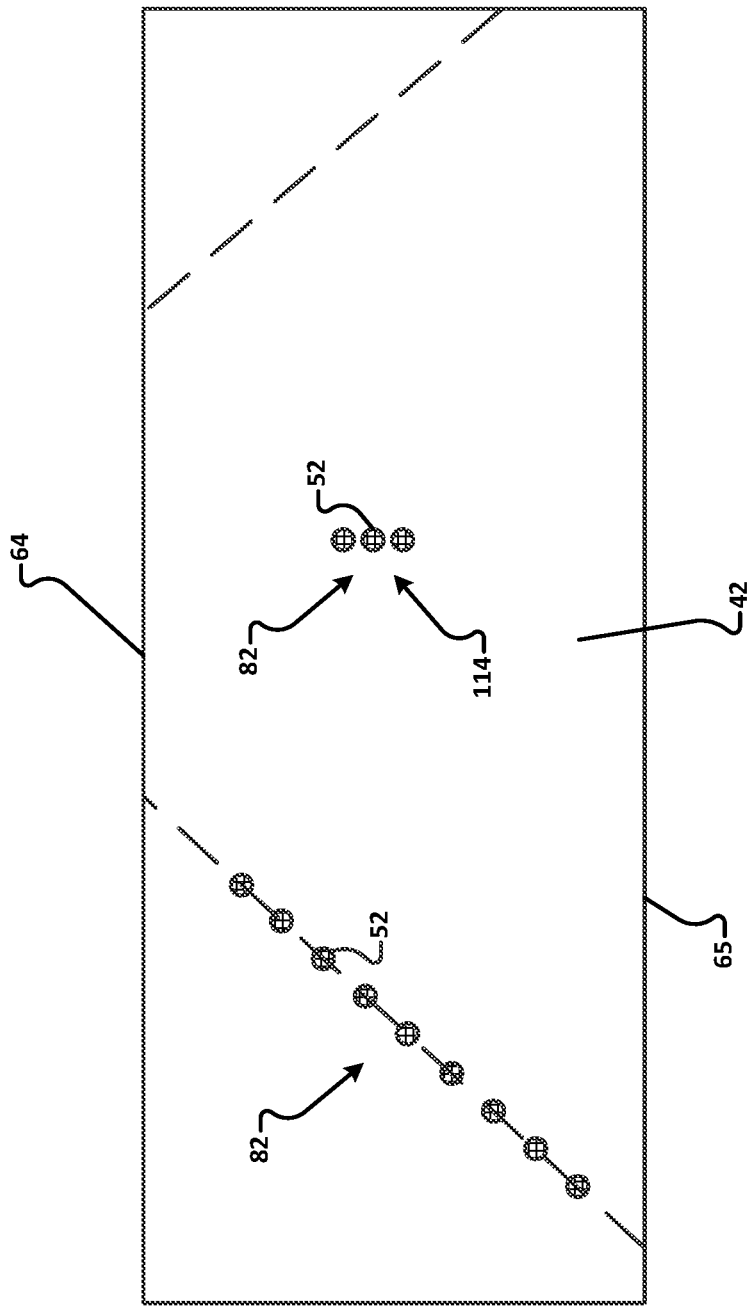

VEHICULAR MULTI-PURPOSE WARNING HEAD-UP DISPLAY

CROSS-REFERENCE TO RELATED APPLICATIONS

This application claims the benefit of U.S. Provisional Application No. 62/103,380, filed on Jan. 14, 2015. The entire disclosure of the above application is incorporated herein by reference.

FIELD

The present disclosure relates to a display for a vehicle and, more particularly, to a head-up display device having an integrated multi-purpose warning system.

BACKGROUND

This section provides background information related to the present disclosure and is not necessarily prior art.

Recently, an increasing number of various vehicles embrace a display device that incorporates techniques of projecting information directly into a human's field of vision, i.e., a head-up display device. The display device of this kind helps to improve a driver's visibility of the environment around the vehicle while viewing the display device. A virtual image presented by the display device is superimposed on the windshield of the automobile within the driver's field of vision. The head-up display typically has a display module as a main functional module dedicated to virtual image display and a reflection member provided in an instrument panel of a vehicle, and light emitted by the display module is reflected toward a driver off the windshield or a combiner that protrudes from an upper surface of the instrument panel, so that the driver recognizes what is presented within his or her field of vision during driving.

Drivers are also provided with a variety of warning indicators or signals throughout the vehicle, such as tones that sound when a vehicle crosses lines on the road, or lights that flash in the side mirrors when objects are in the driver's blind spot. These types of warning indicators are helpful in alerting the driver of unknown or dangerous situations. However, if too many warning indicators or signals are present throughout the vehicle, the driver may become overwhelmed or overloaded with information or could easily become distracted.

SUMMARY

This section provides a general summary of the disclosure, and is not a comprehensive disclosure of its full scope or all of its features.

A vehicle head-up display device includes a display control module that receives signals from a plurality of sources and determines one or more warnings based on the signals. The warnings may include at least one of a lane departure warning, a blind spot warning, a following or front distance indicator, a backup distance indicator, a head-on threat warning, and/or a lateral threat warning. A display module has a plurality of light sources that selectively project a plurality of light patterns onto a plurality of locations on a windshield of a vehicle such that the plurality of light patterns are superimposed on objects outside of the vehicle. The display module is configured to illuminate the plurality of light sources in one of a first mode, a second mode, a third mode, a fourth mode, a fifth mode, and a sixth mode. The first mode illuminates the plurality of light patterns corresponding to the lane departure warning, the second mode illuminates the plurality of light patterns corresponding to the blind spot warning, the third mode illuminates the plurality of light patterns corresponding to the following distance indicator and/or backup distance indicator, the fourth mode illuminates the plurality of light patterns corresponding to the head-on threat warning, the fifth mode illuminates the plurality of light patterns corresponding to the lateral threat warning, and the sixth mode illuminates the plurality of light patterns corresponding to a plurality of the first through fifth modes. The display module is capable of displaying the first through fifth modes simultaneously. The display control module determines which of the plurality of light sources to illuminate based on one or more of the warnings delivered from the display control module.

The vehicle head-up display device may display a plurality of warnings that may be selectively enabled or disabled by a driver of the vehicle.

The vehicle head-up display device may display one or more warnings that may be based on signals indicating at least one of a vehicle speed, a vehicle acceleration, a pedal position, a turn signal activation, an existence of a second vehicle, lane marker, or target, a speed of a second vehicle or target, and a position of a second vehicle, lane marker, or target.

The vehicle head-up display may further include a plurality of point light sources that are light emitting diodes. The plurality of light emitting diodes may be colored green, yellow, and/or red.

The vehicle head-up display may further include a detecting module configured to detect at least one of a second vehicle, a target, and a lane marker.

The vehicle head-up display may further include a detecting module that receives signals from at least one of a radar, lidar, camera, and vehicle-to-vehicle communication (V2V or V2X) device to determine presence, speed, and position, of the at least one of the second vehicle, target, and lane marker.

The vehicle head-up display may further include an information module configured to obtain vehicle information from a plurality of sensors and controllers.

The vehicle head-up display may further include a display control module that determines the one or more warnings based on communications from the detecting module and the information module.

The vehicle head-up display may further include a display module that is provided on a surface of an instrument panel of a vehicle, opposed to a windshield of the vehicle.

The vehicle head-up display may further include a lane departure warning and a blind spot warning that are displayed on the windshield by illuminating the plurality of light sources projecting the light patterns that overlay a lane marker. The lane departure warning may only display the plurality of light sources that project the light patterns overlaying the lane marker over which the vehicle is crossing are illuminated. The lane departure warning may be displayed by repeatedly illuminating the plurality of light sources such that the light patterns overlaying the lane marker blink. The blind spot warning may display the plurality of light sources that project the light patterns near or adjacent the lane marker on a side of the vehicle where a second object is passing. The lane departure warning or blind spot warning may be displayed by illuminating the plurality of light sources in sequence, from closest to an instrument panel to furthest from the instrument panel.

The vehicle head-up display may further include a following or front distance indicator and/or backup distance indicator that are displayed on the windshield by illuminating the plurality of light sources projecting the light patterns along a straight, vertical line close to the instrument panel. The following distance indicator and/or backup distance indicator may be displayed by illuminating one of a first group of light sources, a second group of light sources, and a third group of light sources. The first group of light sources may be closest to (or farthest from) an instrument panel and colored green to indicate an appropriate following distance and/or backup distance, the second group of light sources may be further from the instrument panel, adjacent to the first group of light sources, and colored yellow to indicate a close following/backup distance, and the third group of light sources may be farthest from (or closest to) the instrument panel, adjacent to the second group of light sources, and colored red to indicate a dangerous front/following/backup distance.

The vehicle head-up display may further include a head-on threat warning that is displayed on the windshield by illuminating the plurality of light sources projecting the light patterns that overlay a second object outside the vehicle. The head-on threat warning may be displayed by repeatedly illuminating the plurality of light sources such that light patterns blink indicating that a head-on vehicle crash is likely to imminently occur. In cases of imminent danger, the appropriate light source is colored red, while in cases of caution the light source may be colored yellow. When the vehicle is at a proper distance or position, the light source may be colored green.

The vehicle head-up display may further include a lateral threat warning that is displayed on the windshield by illuminating the plurality of light sources projecting the light patterns that are displayed for both the head-on threat warning and the lane departure warning.

In other aspects, a vehicle head-up display device includes a display control module that receives signals from a plurality of sources and determines one or more warnings based on the signals. The warnings may include at least one of a lane departure warning, a blind spot warning, a following or front distance indicator, a backup distance indicator, a head-on threat warning, and/or a lateral threat warning. A display module has a plurality of light sources comprising light emitting diodes (LEDs) that selectively project a plurality of light patterns onto a plurality of locations on a windshield of a vehicle such that the plurality of light patterns are superimposed on objects outside of the vehicle. The display module is configured to illuminate the plurality of light sources in one of a first mode, a second mode, a third mode, a fourth mode, and a fifth mode. The first mode illuminates the plurality of light patterns corresponding to the lane departure warning and/or the blind spot warning, the second mode illuminates the plurality of light patterns corresponding to the following distance indicator and/or backup distance indicator, the third mode illuminates the plurality of light patterns corresponding to the head-on threat warning, the fourth mode illuminates the plurality of light patterns corresponding to the lateral threat warning, and the fifth mode illuminates the plurality of light patterns corresponding to a plurality of the first through fourth modes. The display module is capable of displaying the first through fourth modes simultaneously. The display control module determines which of the plurality of light sources to illuminate based on one or more of the warnings delivered from the display control module.

The vehicle head-up display device may display a plurality of warnings that may be selectively enabled or disabled by a driver of the vehicle.

The vehicle head-up display device may display one or more warnings that may be based on signals indicating at least one of a vehicle speed, a vehicle acceleration, a pedal position, a turn signal activation, an existence of a second vehicle, lane marker, or target, a speed of a second vehicle or target, and a position of a second vehicle, lane marker, or target.

The vehicle head-up display may further include light emitting diodes that generate red colored light, yellow colored light, and green colored light.

The vehicle head-up display may further include a detecting module configured to detect at least one of a second vehicle, a target, and a lane marker.

The vehicle head-up display may further include a detecting module that receives signals from at least one of a radar, lidar, camera, and vehicle-to-vehicle communication (V2V or V2X) device to determine presence, speed, and position, of the at least one of the second vehicle, target, and lane marker.

The vehicle head-up display may further include an information module configured to obtain vehicle information from a plurality of sensors and controllers.

The vehicle head-up display may further include a display control module that determines the one or more warnings based on communications from the detecting module and the information module.

The vehicle head-up display may further include a display module that is provided on a surface of an instrument panel of a vehicle, opposed to a windshield of the vehicle.

The vehicle head-up display may further include a lane departure warning and a blind spot warning that are displayed on the windshield by illuminating the plurality of light sources projecting the light patterns that overlay a lane marker. The lane departure warning may only display the plurality of light sources that project the light patterns overlaying the lane marker over which the vehicle is crossing are illuminated. The lane departure warning may be displayed by repeatedly illuminating the plurality of light sources such that the light patterns overlaying the lane marker blink. The blind spot warning may display the plurality of light sources that project the light patterns near or adjacent the lane marker on a side of the vehicle where a second object is passing. The lane departure warning or blind spot warning may be displayed by illuminating the plurality of light sources in sequence, from closest to an instrument panel to furthest from the instrument panel.

The vehicle head-up display may further include a following or front distance indicator and/or backup distance indicator that are displayed on the windshield by illuminating the plurality of light sources projecting the light patterns along a straight, vertical line close to the instrument panel. The following distance indicator and/or backup distance indicator may be displayed by illuminating one of a first group of light sources, a second group of light sources, and a third group of light sources. The first group of light sources may be closest to (or farthest from) an instrument panel and colored green to indicate an appropriate following distance and/or backup distance, the second group of light sources may be further from the instrument panel, adjacent to the first group of light sources, and colored yellow to indicate a close following/backup distance, and the third group of light sources may be farthest from (or closest to) the instrument panel, adjacent to the second group of light sources, and colored red to indicate a dangerous front/following/backup distance.

The vehicle head-up display may further include a head-on threat warning that is displayed on the windshield by illuminating the plurality of light sources projecting the light patterns that overlay a second object outside the vehicle. The head-on threat warning may be displayed by repeatedly illuminating the plurality of light sources such that light patterns blink indicating that a head-on vehicle crash is likely to imminently occur. In cases of imminent danger, the appropriate light source is colored red, while in cases of caution the light source may be colored yellow. When the vehicle is at a proper distance or position, the light source may be colored green.

The vehicle head-up display may further include a lateral threat warning that is displayed on the windshield by illuminating the plurality of light sources projecting the light patterns that are displayed for both the head-on threat warning and the lane departure warning.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a front view of the window of a vehicle having the head-up display illustrated in FIG. 1 displaying an example lane departure warning;

FIG. 10 is a front view of the window of a vehicle having the head-up display illustrated in FIG. 1 displaying an example combination of warnings.

Corresponding reference numerals indicate corresponding parts throughout the several views of the drawings.

DETAILED DESCRIPTION

Example embodiments will now be described more fully with reference to the accompanying drawings.

Figure 1:
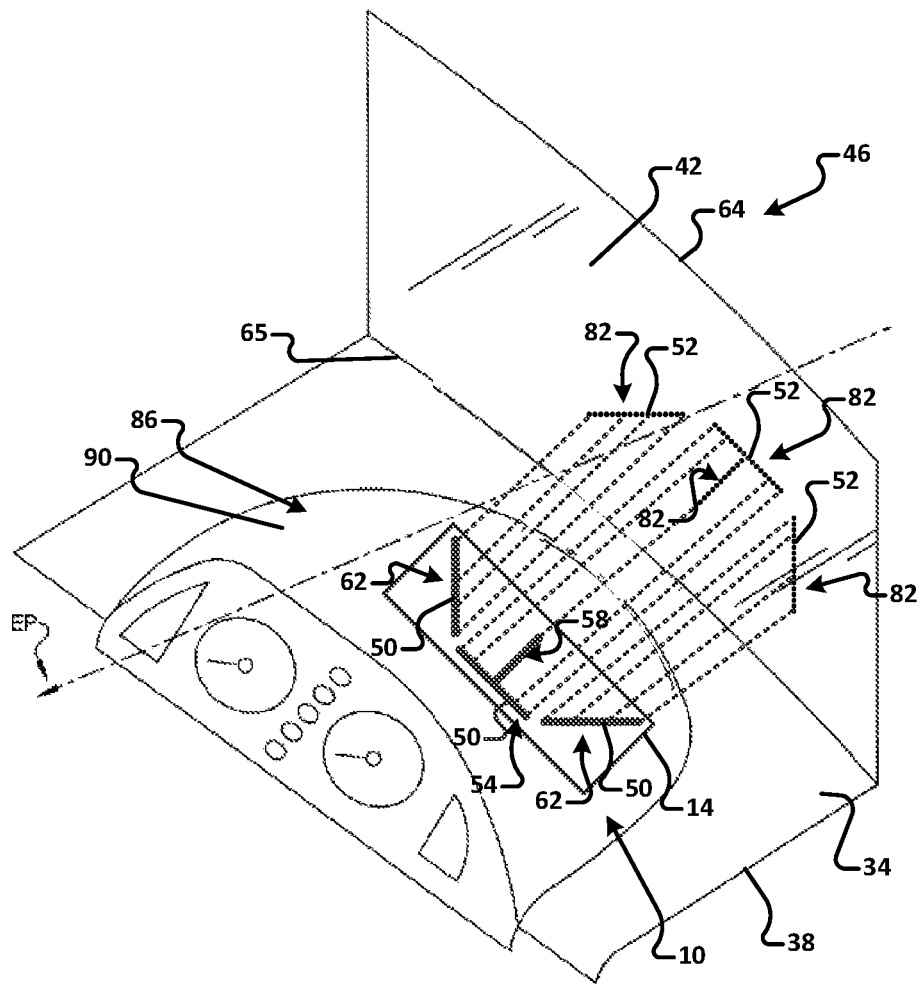
FIG. 1 is a perspective view of a head-up display according to the present disclosure installed within a vehicle.
Figure 2:
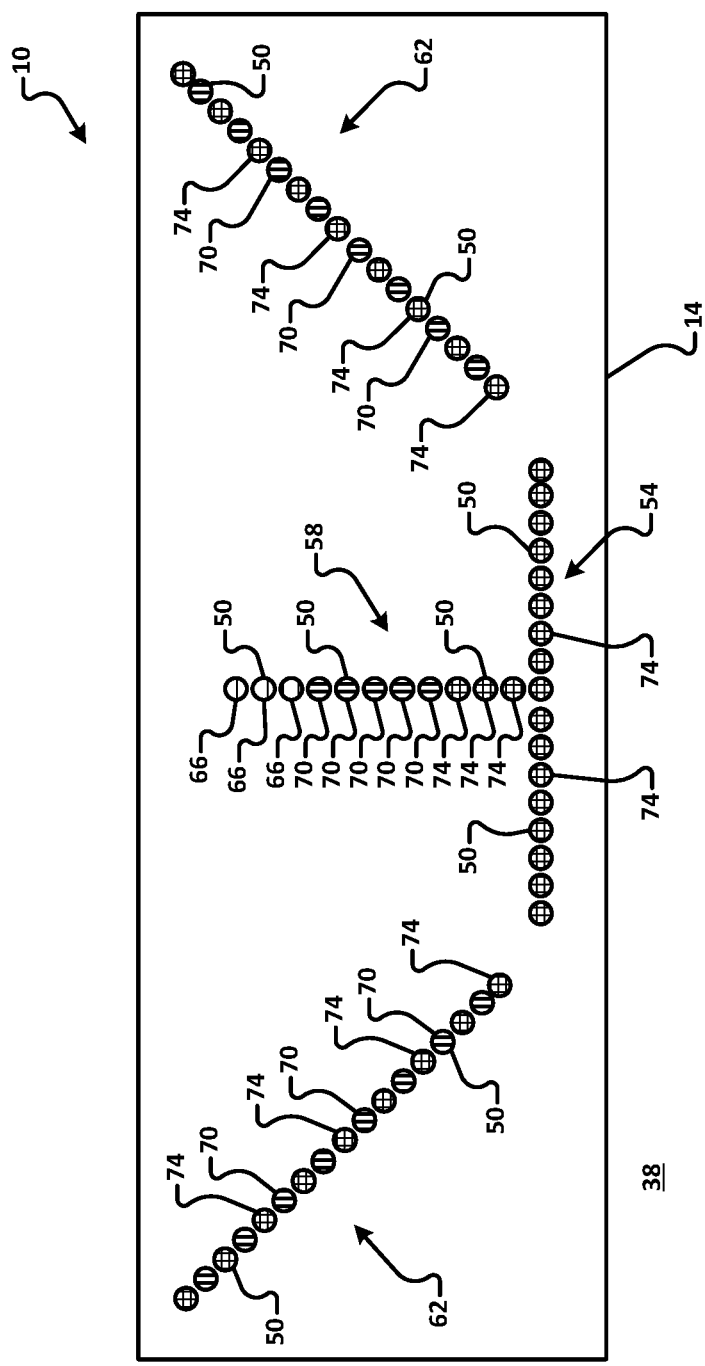
FIG. 2 is a top view of the head-up display illustrated in FIG. 1.
Figure 3:
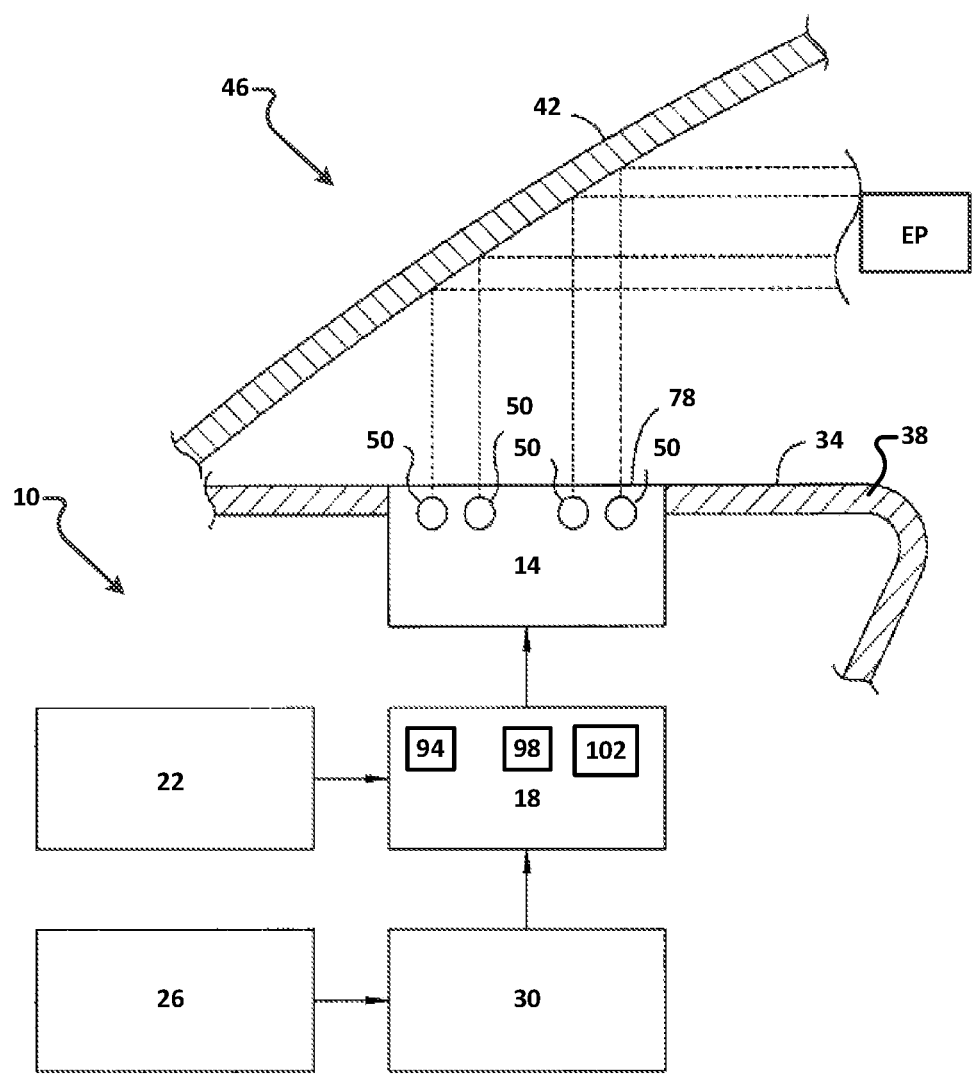
FIG. 3 is a side view of the head-up display illustrated in FIG. 1 and an accompanying control system.

A vehicular multi-purpose warning head-up display device 10 according to one embodiment of the present teachings is described below with reference to FIGS. 1 to 9. Referring to FIGS. 1-3, the head-up display device 10 has a display module 14, a display control module 18 (FIG. 3), an information acquisition module 22 (FIG. 3), a detecting module 26 (FIG. 3), and a control module 30 (FIG. 3). The display module 14 can be, for instance, a multi-purpose warning head-up display. The display module 14, the information acquisition module 22, the detecting module 26, and the control module 30 are electrically connected to the display control module 18 via known interfaces.

The display module 14 can be provided on a surface 34 of an instrument panel 38 such that the display module 14 is opposed to a windshield 42 of a vehicle 46. The display module 14 has a plurality of point light sources 50. The point light sources 50 may be a plurality of arranged light-emitting diodes (LEDs) or bulbs. Referring specifically to FIGS. 1 and 2, some of the point light sources 54 are provided on the instrument panel 38 and are arranged in a width direction of a vehicle body such that a plurality of information dots, or light patterns, 52 are selectively displayed on the windshield 42 in a row extending in the width direction of the vehicle body and are superposed on a real image such as an obstacle ahead of the vehicle (e.g., an aft end of another vehicle and/or object) and/or a landscape in a direction of driving. Others of the point light sources 58 may be arranged in a length direction of a vehicle body such that a plurality of information dots 52 are selectively displayed on the windshield 42 in a row extending in a vertical direction and are superposed on a real image such as an obstacle ahead of the vehicle and a landscape in a direction of driving. Others of the point light sources 62 may be arranged in a diagonal direction of a vehicle body such that a plurality of information dots 52 are selectively displayed on the windshield 42 in a row extending in a diagonal direction and are superposed on a real image such as on or near lane markers, an obstacle ahead of the vehicle and/or a landscape in a direction of driving. Each of the plurality of information dots 52 may be displayed between a top 64 and a bottom 65 of the windshield 42 and may be closer to the bottom 65 of the windshield 42 than the top 64 of the windshield 42.

Each of the plurality of point light sources 50 may be one of a variety of colors. For example only, each of the plurality of point light sources 50 may be one of green 66, yellow 70, or red 74 to indicate various levels of warnings. Each row 54, 58, 62 of the plurality of point light sources 50 may include one of both yellow and red point light sources 70, 74 or all green, yellow, and red point light sources 66, 70, 74. As described further below, the arrangements of the plurality of point light sources 50 are placed in accordance with geometry of the windshield 42 and the instrument panel 38, as well as a driver's position within the vehicle 46.

The plurality of point light sources 50 are mounted on the display module 14 and are arranged at an opening 78 of the instrument panel 38 such that the point light sources 50 continue to the surface 34 of the instrument panel 38. Referring to FIG. 1, the point light sources 50 may be arranged such that the point light sources 50 reflect off the windshield 42 in positions overlaying objects in the environment. For example, some point light sources 62 may reflect in positions overlaying left and right lane markers on a road. Such point light sources 62 may also reflect in positions adjacent to or near left and right lane markers on a road. The point light sources 62 are positioned such that based on the intersection of an average driver's eye path (EP) with the windshield 42, the point light sources 62 shine light 82 on a portion of the windshield 42 in which the driver views the left and/or right lane markers. Thus, the lights 82 appear to be on top of the lane markers. This same approach is used for the lights 82 overlaying vehicle brake lights in front of the driver and vehicles or other objects to the left or right of the driver.

In some embodiments, the display module 14 may be mounted on a sloped portion 86 of the instrument panel 38 which is sloped in a direction pointing away from the driver such that the driver's eye path EP does not intersect with a surface 90 of the sloped portion. Thus, the driver cannot see the display module 14 or point light sources 50. In other embodiments, a shielding member (not shown) may be provided. The shielding member extends from a portion of the surface 34 of the instrument panel 38 upward toward the windshield 42 so as to reside between the driver's eye point EP and the display module 14. The shielding member prevents the display module 14 from being directly viewed from the driver's eye point EP.

Referring to FIG. 3, the display control module 18 can be a microcontroller that has at least a central processing module 94, a read-only memory module 98, and a readable/writable memory module 102. The read-only memory module 98 stores programs utilized by the central processing module 94. One of such programs is for display control operation which will be described later. The central processing module 94 runs programs including the display control operation program stored in the read-only memory module 98.

The detecting module 26 detects an existence of and a position of another vehicle, lane marker, or other target using, for example, radar, lidar, sensors, cameras, or vehicle-to-vehicle communication (V2V or V2X), and outputs the received data to the control module 30 for interpretation, target identification, and position determination. It is noted that the detecting module 26 allows various modifications insofar as the second vehicle, lane marker, or other target can be duly detected. For example, by using two cameras such as charge-coupled device (CCD) cameras and video cameras, the image data captured by these cameras are output to the control module 30, and, on the basis of the image data, the control module 30 may recognize the target through image processing. The detecting module 26 may also receive data from both radar and a camera and communicate the data to the control module 30 for processing and recognition. Other approaches are also possible.

The control module 30 receives the target data from the detecting module 26 and analyzes the data for interpretation, target identification, and position determination. Depending on the type of data received, the control module 30 may determine the position, speed of travel, acceleration/deceleration, and other parameters of the second vehicle, lane marker, or other target/object. The control module 30 communicates the data to the display control module 18 for warning determination.

The information acquisition module 22 compiles vehicle information from the various sensors and controllers throughout the vehicle 46. For example only, the information acquisition module 22 may compile information related to vehicle speed and acceleration, pedal position, turn signal activation, etc. The information acquisition module 22 then communicates the compiled vehicle information to the display control module 18 for warning determination.

The display control module 18 receives the data from the control module 30 and the information acquisition module 22. The display control module 18 utilizes the data to determine an appropriate warning. For example only, at least one of a lane departure warning, blind spot warning, following or front distance warning or backup distance warning, imminent crash warning, and/or lateral threat warning may be identified. Once the display control module 18 determines one or more warnings to activate, the display control module 18 determines the appropriate point light sources 50 that correlate with the one or more warnings. The display control module 18 then communicates commands to illuminate the appropriate point light sources 50 for the one or more warnings to the display module 14. Depending on the severity of the warning, the plurality of light sources may be different colored LEDs. For imminent danger, such as forward, rear, side and/or lateral collision warning, the light source may be colored red. Where the warning is cautionary, for example, for a blind spot warning, the light source is yellow. When the vehicle is following another lead vehicle at a proper distance or is otherwise in a safe or proper position, the light source is green.

The display control module 18 also includes switches and buttons used to handle various settings of the head-up display device 10, so that the driver can specify the settings. For example, the driver may selectively activate one or more of the lane departure warning, blind spot warning, following or front distance warning, backup distance warning, imminent crash warning, and/or lateral threat warning such that the driver controls which warnings can be activated on the head-up display 10.

An example display of the information dots 52 focusing on lane departure of the vehicle is described with reference to FIG. 4. In the example shown in FIG. 4, the plurality of information dots 52 are illuminated on the windshield 42 along a straight, diagonal line close to the instrument panel 38 and the bottom 65 of the windshield 42. Only the information dots 52 whose reflections in the windshield 42 overlay lane markers 80 over which the vehicle is crossing, for example only the left lane markers 80, are illuminated. These dots 52, as emitted from the point light sources 74, can be blinking red to warn the driver of lane departure. While FIG. 4 illustrates an example display focusing on lane departure on the left side, it is understood that the same configuration applies to lane departure on the right side. As the vehicle crosses the right lane markers 80, the plurality of information dots 52 whose reflections in the windshield 42 overlay the right lane markers may similarly be illuminated.

Another example display of the information dots 52 focusing on a lane departure warning is described with reference to FIG. 5A. In the example shown in FIG. 5A, the plurality of information dots 52 are illuminated on the windshield 42 along a straight, diagonal line close to the instrument panel 38 and the bottom 65 of the windshield 42. When a portion of the vehicle is riding on or near the lane marker 80, the information dots 52, whose reflections in the windshield 42 overlay the lane markers 80 on the appropriate side, are illuminated. These dots 52, as emitted from the point light sources 70, can be yellow LEDs that light up and/or flash in sequence, from closest to the instrument panel 38 to furthest from the instrument panel 38, to alert the driver to the presence of the second vehicle or another object in the left side blind spot. While FIG. 5A illustrates an example display focusing on the lane marker 80 on the left side of the vehicle, it is understood that the same configuration applies to a lane marker 80 on the right side.

Figure 5A:
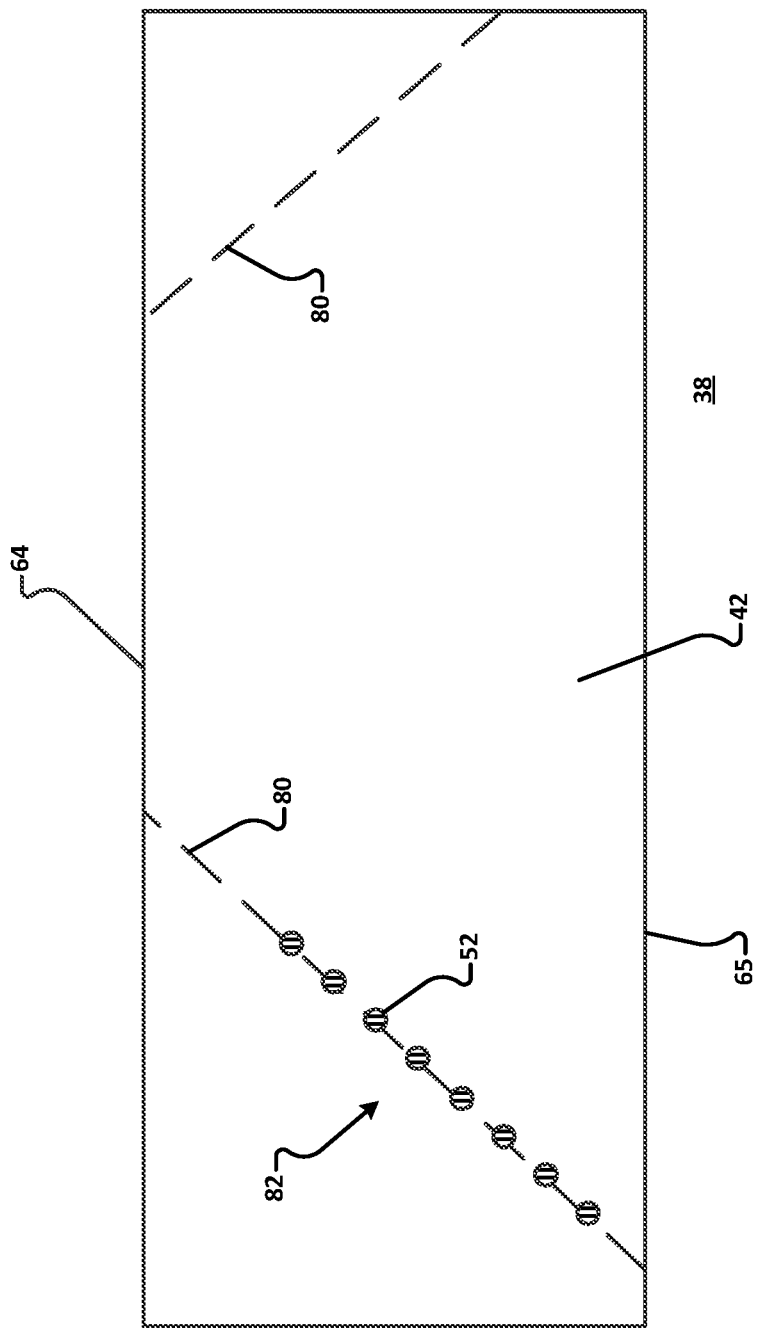
FIGS. 5A-5B are front views of the window of a vehicle having the head-up display illustrated in FIG. 1 displaying an example of a lane-departure warning (FIG. 5A) and a blind spot warning (FIG. 5B)
Figure 5B:
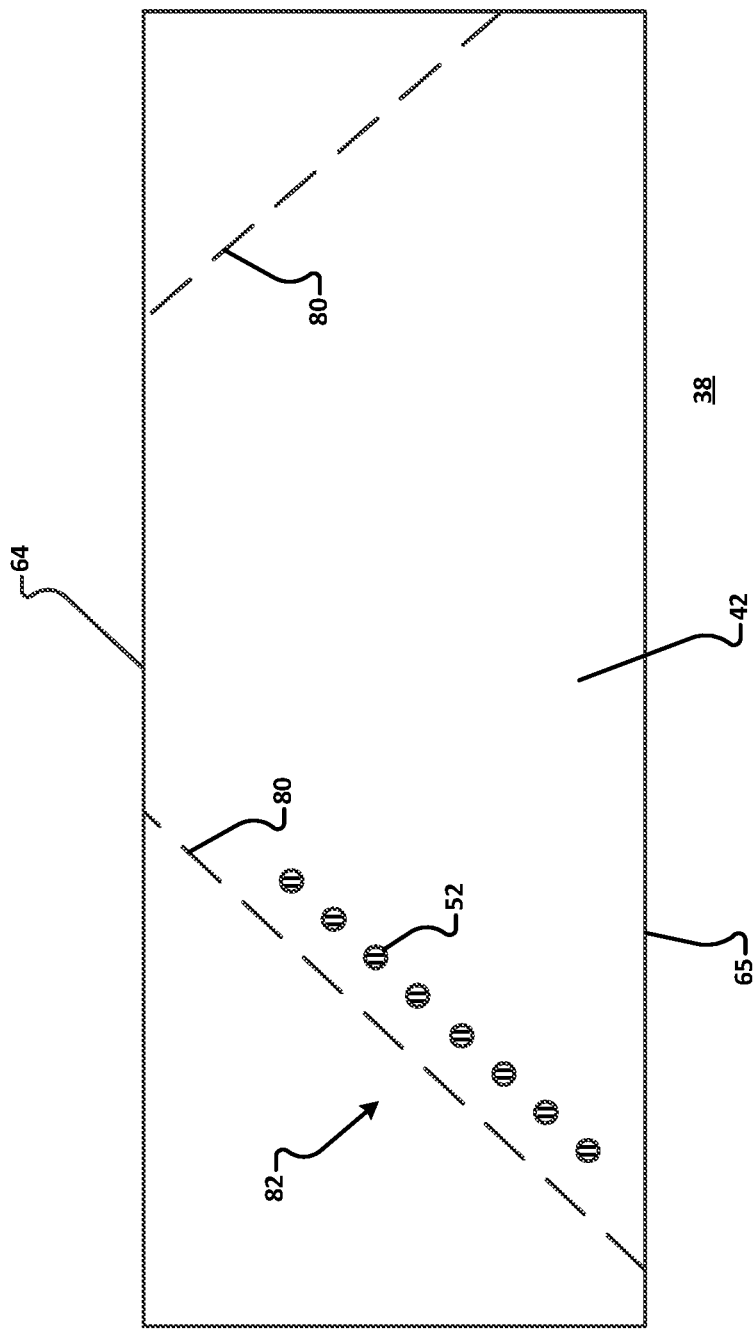

FIG. 5B shows the information dots 52 generated by the point light sources 70 in FIG. 5A showing a blind spot warning. Like in FIG. 5A, in the example shown in FIG. 5B, the plurality of information dots 52 are illuminated on the windshield 42 along a straight, diagonal line close to the instrument panel 38 and the bottom 65 of the windshield 42. As a second vehicle or other object enters into the vehicle's blind spot, the information dots 52 whose reflections in the windshield 42 are shown near or adjacent to lane markers 80 on the side of the vehicle where a second vehicle or object is present, for example only the regions adjacent to the left lane markers 80, are illuminated. These dots 52, as emitted from the point light sources 70, can be yellow LEDs that light up or flash in sequence, from closest to the instrument panel 38 to furthest from the instrument panel 38, to alert the driver to the presence of the second vehicle or another object in the left side blind spot. While FIG. 5B illustrates an example display focusing on the second vehicle or object in the left side blind spot, it is understood that the same configuration applies to a second vehicle or object in the right side blind spot. As the second vehicle or object enters the right side blind spot, the plurality of information dots 52 whose reflections in the windshield 42 are near the right lane markers are illuminated in sequence, from closest to the instrument panel 38 to furthest from the instrument panel 38, to alert the driver to the presence of the second vehicle or another object in the right side blind spot.

Thus, as shown in FIGS. 5A-5B, when a portion of the vehicle is riding on the lane marker 80, the point light sources 70 illuminate the plurality of information dots 52 on the windshield 42 over where the lane marker 80 appears to caution the vehicle operator as to potential or actual lane departure. When the vehicle is traveling and centered within the lane; however, the same point light sources 70 illuminate the plurality of information dots 52 on the windshield 42 to indicate that a vehicle is approaching from a blind spot. However, the information dots 52 are positioned adjacent to or near the lane marker 80 that is seen through the windshield 42. It should be further noted that both the lane departure warnings displays generated from the embodiments shown in FIGS. 4 and 5A can be used together or alternatively, only one lane departure indicator/warning display may be present or selectively used.

Figure 6A:
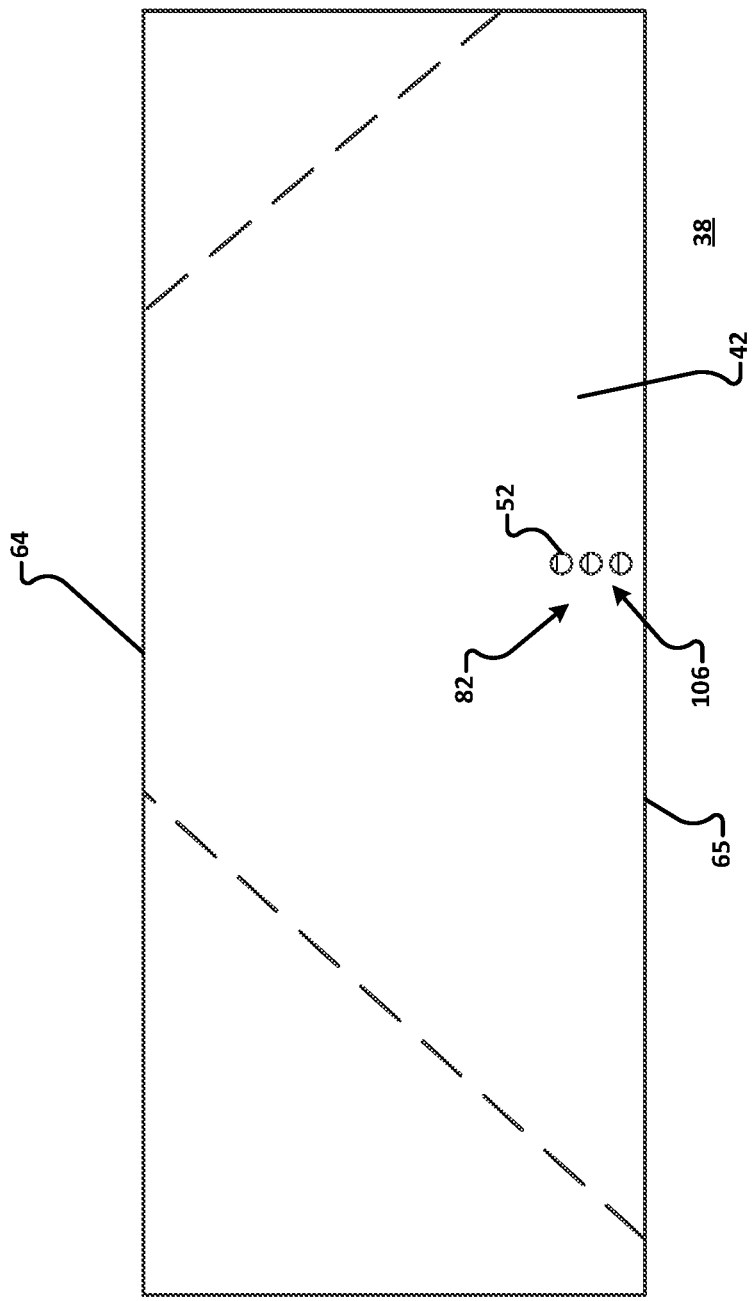
FIGS. 6A-6C are front views of the window of a vehicle having the head-up display illustrated in FIG. 1 displaying examples of following/backup distance warnings.
Figure 6B:
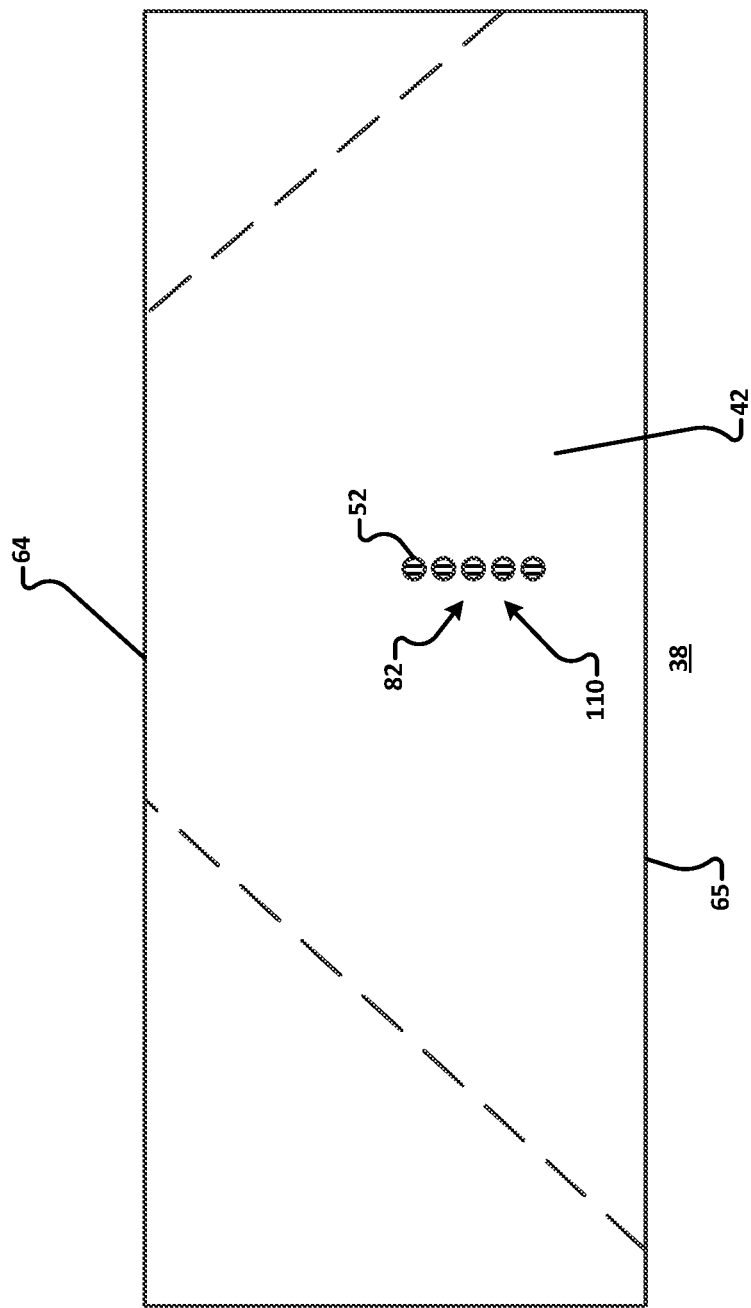

An example display of the information dots 52 focusing on following distance of the vehicle is described with reference to FIGS. 6A-6C. In the examples shown in FIGS. 6A-6C, the plurality of information dots 52 are illuminated on the windshield 42 along a straight, vertical line close to the instrument panel 38. Such information dots 52 may indicate a following or front distance indicator and/or a backup distance indicator. In FIG. 6A, a first set 106 of the information dots 52 may be located at a closest position to the instrument panel 38 and may be colored green to indicate that the vehicle is following a second vehicle at a safe distance or proper distance or is at a safe distance from the another object in front of the vehicle. For example only, for a following distance, the safe distance may be greater than a distance of 264 feet (at a speed of 60 mph) such that the vehicle could be safely stopped without contacting the second vehicle. For a front distance indicator used during parking, the safe distance may be greater than 4-5 feet so that the vehicle could be safely stopped at low speeds without contacting a second vehicle, an object or obstacle, a person, an animal, or the like, by way of non-limiting example only. For a backup distance indicator, the safe distance may be greater than 4-5 feet so that the vehicle could be safely stopped when in reverse without contacting a second vehicle, an object or obstacle, a person, an animal, or the like during parking, by way of non-limiting example only. In FIG. 6B, a second set 110 of the information dots 52 may be located at a slightly further position from the instrument panel 38 and adjacent to the first set 106 of the information dots 52. The second set 110 of the information dots 52 may be colored yellow to indicate that the vehicle is following a second vehicle at a close distance, for example only, within a range of 88-264 feet (at a speed of 60 mph) for the following distance indicator. For a front distance indicator used during parking, the second set 110 of the information dots 52 may be colored yellow to indicate that the vehicle is at a close distance from a second vehicle, an object or obstacle, a person, an animal, or the like, for example only, within a range of 2-5 feet. For a backup distance indicator, the second set 110 of the information dots 52 may be colored yellow to indicate that the vehicle when in reverse is at a close distance from a second vehicle, an object or obstacle, a person, an animal, or the like, for example only, within a range of 2-5 feet.

Figure 6C:
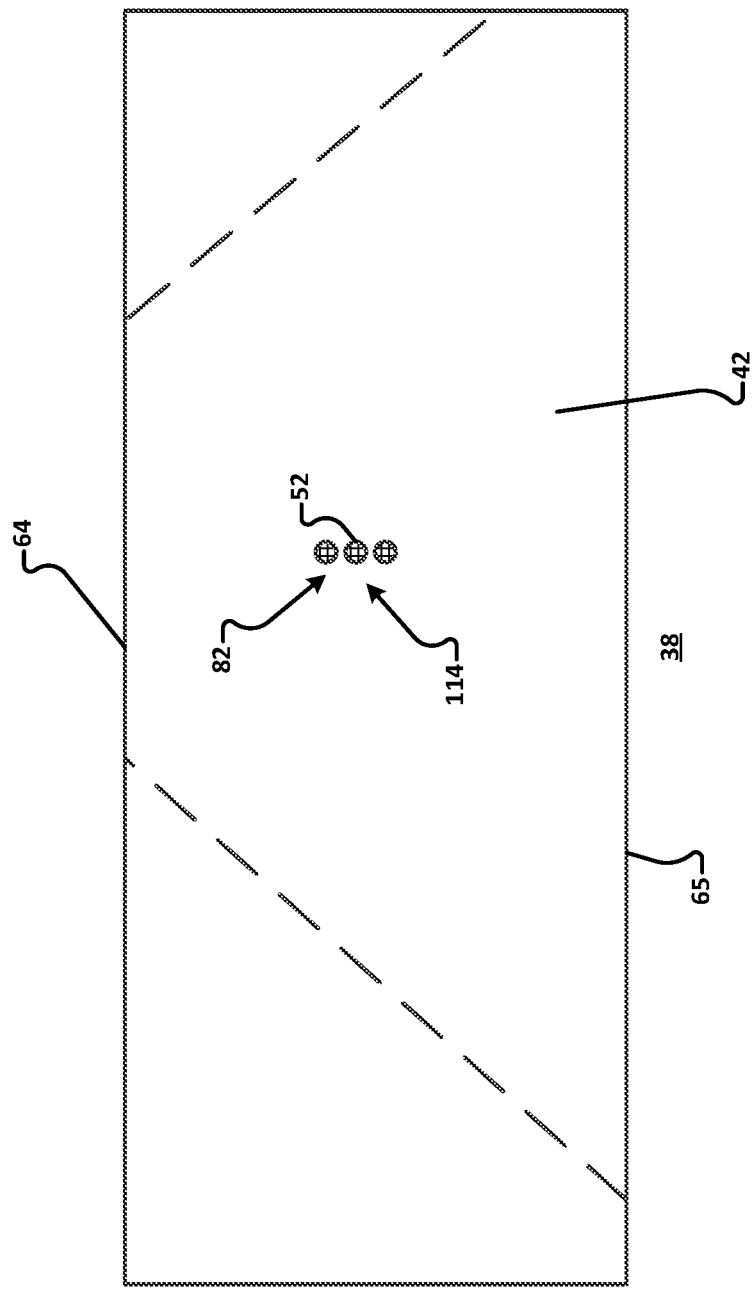

In FIG. 6C, a third set 114 of the information dots 52 may be located at a further position from the instrument panel 38 and adjacent to the second set 110 of the information dots 52. The third set 114 of the information dots 52 may be colored red to indicate that the vehicle is following a second vehicle at a dangerously close distance, for example only, within a range of 0-88 feet (at a speed of 60 mph) for the following distance indicator. For the front distance indicator, the third set 114 of the information dots 52 may be colored red to indicate that the vehicle is at a dangerously close distance from contact with a second vehicle, an object or obstacle, a person, an animal, or the like, for example only, less than about 1-2 feet. For the backup distance indicator, the third set 114 of the information dots 52 may be colored red to indicate that the vehicle in reverse is at a dangerously close distance from contact with a second vehicle, an object or obstacle, a person, an animal, or the like, for example only, less than about 1-2 feet. It should be noted that while not shown in FIGS. 6A-6C, the information dots 52 for the backup distance indicator may have a different orientation with respect on the windshield 42 and position with respect to the instrument panel 38 as appreciated by those of skill in the art, so that the first set 106 of information dots 52 is located farthest away from the instrument panel 38 and the third set 114 is located closest to the instrument panel 38 to comport with the direction of the vehicle in reverse.

Figure 7:
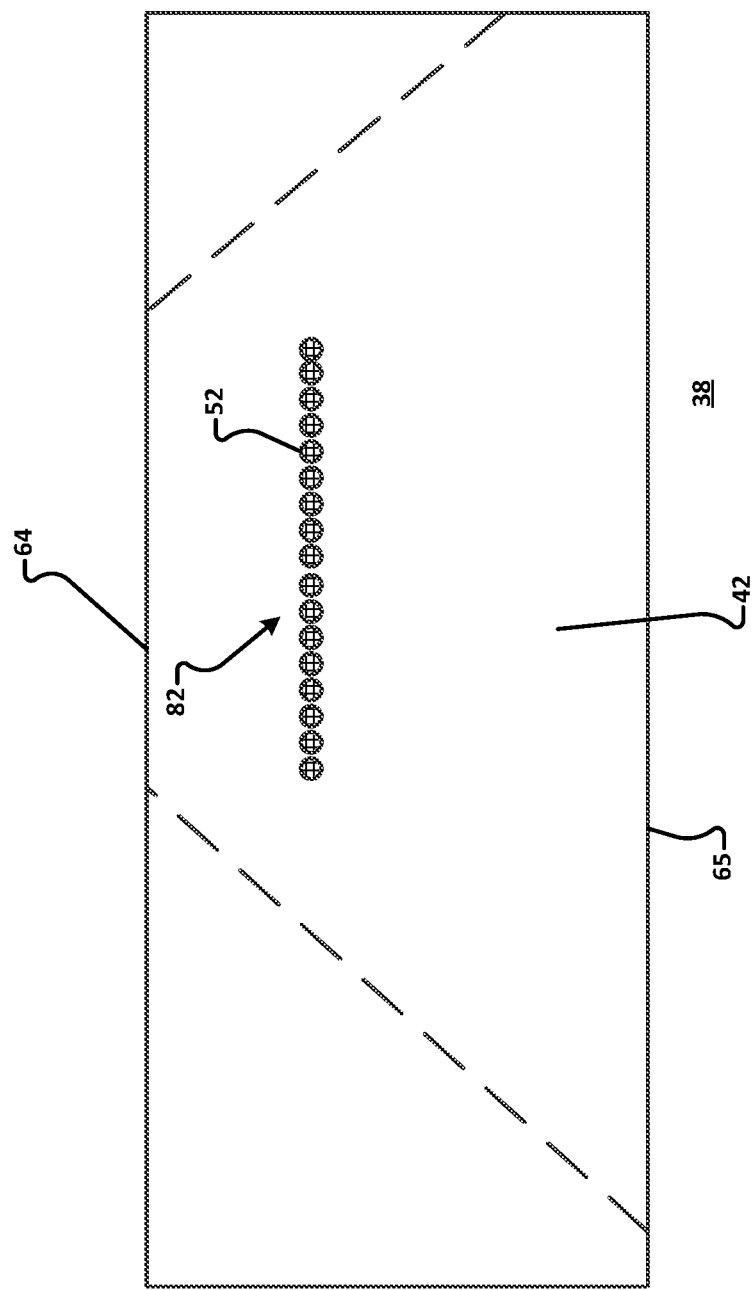
FIG. 7 is a front view of the window of a vehicle having the head-up display illustrated in FIG. 1 displaying an example imminent crash warning.

An example display of the information dots 52 focusing on an imminent crash, or head on threat, warning is described with reference to FIG. 7. In the example shown in FIG. 7, the plurality of information dots 52 is illuminated on the windshield 42 along a straight line close to the instrument panel 38. The information dots 52 whose reflections in the windshield 42 are in a straight line across the width of the windshield 42 in an area near a second vehicle's brake lights are illuminated. The information dots 52 may be colored red and may blink to attract the driver's attention and indicate that a head-on vehicle crash is likely to imminently occur. For example only, an imminent crash warning may be indicated when the vehicle is a predetermined distance (for example only, within a range of less than 25 feet of from another vehicle or object and traveling within a predetermined speed range (for example only, accelerating or traveling at least 25 mph).

Figure 8:
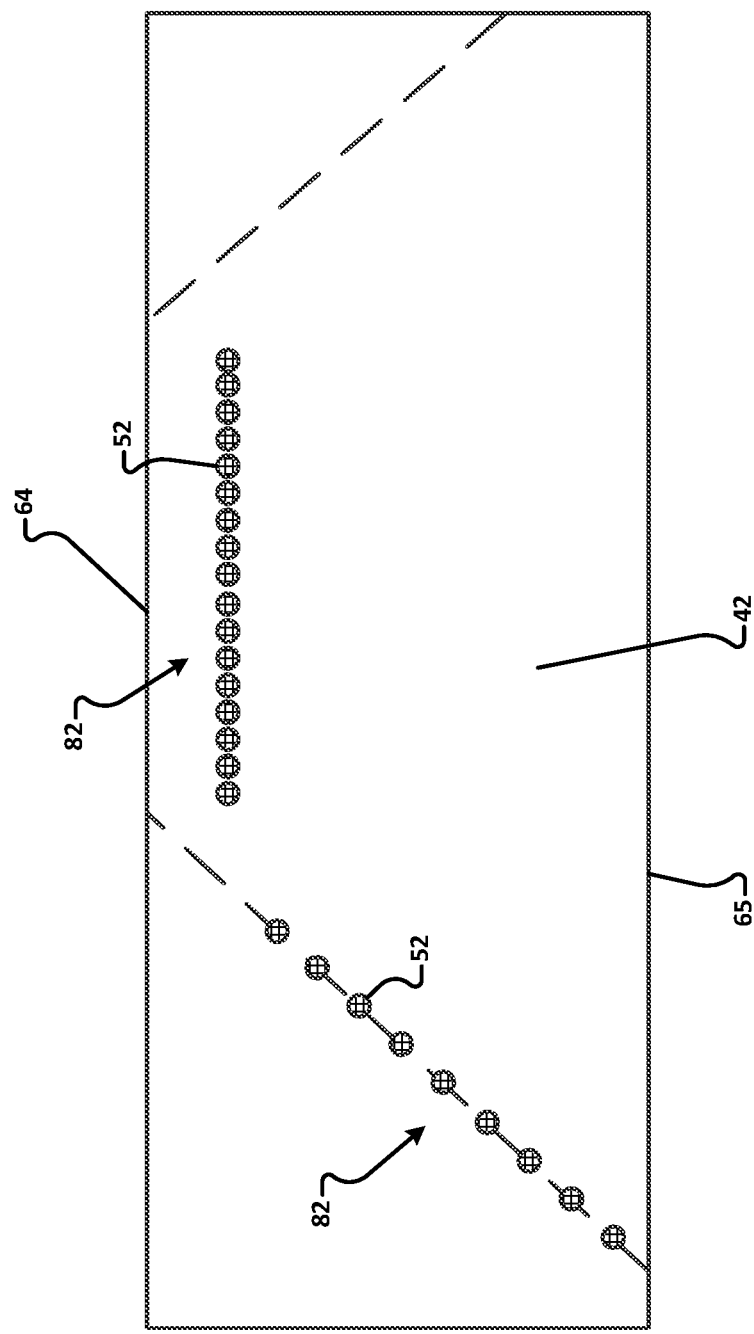
FIG. 8 is a front view of the window of a vehicle having the head-up display illustrated in FIG. 1 displaying an example lateral threat warning.

An example display of the information dots 52 focusing on a lateral threat warning is described with reference to FIG. 8. In the example shown in FIG. 8, the plurality of information dots 52 are illuminated on the windshield 42 along a straight line, close to the instrument panel 38, and across the width of the windshield 42 and a straight, diagonal line, close to the instrument panel 38, and overlaying one of the left lane marker and right lane marker. For example only, the plurality of information dots 52 may be illuminated along the straight line across the width of the windshield 42 and along the straight, diagonal line overlaying or near the left lane marker for a left lateral threat (FIG. 8). The plurality of information dots 52 may be illuminated along the straight line across the width of the windshield 42 and along the straight, diagonal line overlaying or near the right lane marker for a right lateral threat. The lateral threat warning utilizes the information dots 52 illuminated for the imminent crash warning and the lane departure warning. The information dots 52 may be colored red and may blink to attract the driver's attention and indicate that a lateral threat is present.

The lateral threat warning may illuminate when a second vehicle, or other object, approaches from either the right or left side of the vehicle and is likely to hit the vehicle. For example only, the lateral threat warning my illuminate when the second vehicle or object is within a predetermined distance (for example only, within 25 feet) of the vehicle and traveling at constant speed, increasing speed, or slowing speed that will not result in the second vehicle's stop before impact.

It should be noted that the mode of display of the information dots 52 may be specified by the driver. For example, the driver may selectively enable or disable any of the individual warning features such that none, one, multiple, or all of the warnings are enabled.

Figure 9:
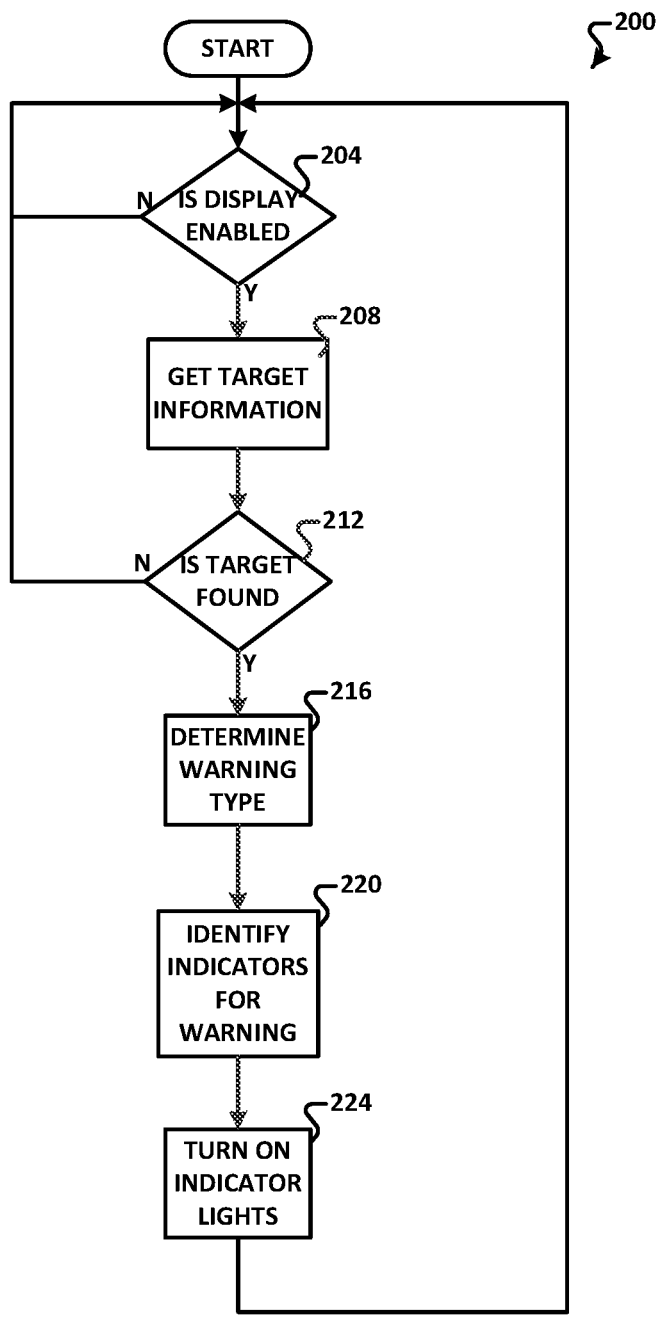
FIG. 9 is a flow chart describing the functions of the head-up display and control system illustrated in FIG. 3.

An example of the display control 200 by the central processing module 94 of the head-up display device 10 is explained below with reference to a flow chart shown in FIG. 9. Note that the display control 200 is forcibly terminated when the power is shut down or upon a termination request. When the head-up display device 10 is activated and the central processing module 94 runs the display control operation program, whether display functionality is set to an enabled mode or a disabled mode on the basis of the settings of the display mode information stored in the memory module 102 is determined at step 204. If the display functionality is disabled, the above judgment is repeated. If the display functionality is enabled, acquisition of the target information is attempted at step 208. If data on the existence, position, and distance of the target is obtained by the detecting module 26, the data is acquired as the target information and is stored in the memory module 102. For example only, target information may include information on a position and/or speed of the vehicle, a position and/or speed of a second vehicle or obstacle, the position of a lane marker, or any other information relating to the vehicle parameters or environment that assist in detecting a warning such as the lane departure warning, blind spot warning, following or front distance warning, backup distance warning, imminent crash warning, and/or lateral threat warning.

On the basis of existence or absence of the data on the existence, position, and distance of the target contained in the target information stored in the memory module 102, it is judged whether or not there is at least one of a lane departure warning, blind spot warning, following distance warning, imminent crash warning, and/or lateral threat warning. At step 212, the display control 200 determines whether there is a target found. If there is no target found, the process goes back, and a sequence of the previous steps will be repeated. If there exists a target, the operation proceeds to step 216 to determine which of the lane departure warning, blind spot warning, following distance warning, imminent crash warning, and/or lateral threat warning exists.

Based on the position, distance, speed, or other characteristic of the target and the position and speed of the vehicle, the display control 200 may determine which of the lane departure warning, blind spot warning; following distance warning, imminent crash warning, and/or lateral threat warning exists. For example, if the vehicle is within a predetermined distance (for example only, within a range of 2-6 inches) from one of the right or left lane markers and a left or right turn signal of the vehicle is not activated, the display control 200 may enable a lane departure warning. For example, if a second vehicle is within a predetermined range alongside the vehicle (for example only, within 8 feet behind the vehicle to even with the vehicle, and a distance within 10 feet measured perpendicular to the side of the vehicle), the display control 200 may enable a blind spot warning. For example, if the front of the vehicle is within a first predetermined range (for example only at 60 mph, within a range of greater than 264 feet) from a second vehicle or object, the display control 200 may enable a proper following distance indicator (e.g., green indicators); if the front of the vehicle is within a second predetermined range (for example only at 60 mph, within a range of 88-264 feet) from a second vehicle or object, the display control 200 may enable a close following distance indicator (e.g., yellow indicators); and if the front of the vehicle is within a third predetermined range (for example only at 60 mph, within a range of less than 88 feet) from a second vehicle or object, the display control 200 may enable a dangerous following distance indicator (e.g., red indicators). For example, if the vehicle is within a predetermined range (for example only, within a range of less than 25 feet) of another vehicle or object and traveling within a predetermined speed range (for example only, accelerating or traveling at least 25 mph), the display control 200 may enable an imminent crash warning. For example, if a second vehicle is detected in a lateral position to the vehicle and the second vehicle is not stopped or slowing such that the second vehicle will stop before impact, the display control 200 may enable a lateral threat warning. Once the display control 200 determines the type and severity of the warning, the display control 200 identifies the indicators for the warning at step 220.

On the basis of the target information, the type and severity of the warning, and the display area definition information stored in the memory module 102, the information dots 52 that correspond to the warning are identified at step 220 and stored in the central processing module 94. It should be noted that, with regard to how to specify the information dots 52, a definition table that correlates the different information dots 52 to the various warnings may be pre-stored in the central processing module 94, and a number and a position of the information dots 52 to be indicated may be specified on the basis of the definition table.

A request to enable the relevant point light sources 50 that correspond to the warning information dots 52 identified by the central processing module 94 and/or to disable other point light sources 50 is sent to the display module 14. The display module 14 turns on/off the relevant point light sources 50 at step 224. The information dots are indicated at a region corresponding to the environmental features (such as, for example only, the lane markers, brake lights, or other objects) viewed on the windshield 42. The process returns to step 204, and the sequence of the steps is repeated.

With references to FIG. 10, when the display mode information in the memory module 54 is set to the enabled mode, the detecting module 26 detects one or more targets (for example, a lane marker, vehicle, or other object). In a case where two targets are detected and produce two different warnings (such as a lane detection warning and a following distance warning, as illustrated), a plurality of information dots 52 corresponding to the first warning and a plurality of information dots 52 corresponding to the second warning are turned on.

As a result, the lights emitted by the point light sources 50 are reflected off the windshield 42 of the vehicle 46 toward the driver's eye point EP and, thus, the plurality of information dots 52 are indicated for the first warning and the plurality of information dots 52 are indicated for the second warning. In this manner, the driver can move his or her line of sight to a windshield area of the indicated information dots to recognize the indicated warning. While only two simultaneous warnings are described in relation to FIG. 10, it is understood that more than two warnings or any combination of warnings may be simultaneously displayed in the head-up display system.

The information dots 52 relevant to the target information are selected from among the plurality of information dots and projected onto the windshield 42. Accordingly, the display module 14 can be provided on the surface 34 of the instrument panel 38 and can directly project the information dots 52 on the windshield 42 without using a conventional costly reflection member. By indicating the driver's desired information (by allowing selection of the warnings displayed by the head-up display system), the driver's consciousness and viewpoint are directed to the warning information, and the driver can recognize the information dots in an intuitive manner.

Also, since the plurality of point light sources 50 constituting the display module 14 are arranged in rows extending in various directions, the warning information can be associated with the real image found in the vehicle environment.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle head-up display device, comprising:
   a detecting module configured to receive, from a sensor device and/or a vehicle-to-vehicle communication device, detected signals related to objects appearing outside of a vehicle having the head-up display device;
   an information module configured to obtain vehicle information from a plurality of sensors and controllers;
   a display control module receiving signals from a plurality of sources comprising the detecting module and the information module, and determining one or more warnings and a severity of the one or more warnings based on the signals, wherein the warnings include at least one of a lane departure warning, a blind spot warning, a following distance indicator, a front distance indicator, a backup distance indicator, a head-on threat warning, or a lateral threat warning corresponding to the detected signals; and
   a display module structured to selectively project, based on the severity of the one or more warnings, a plurality of light patterns, in the form of information dots, from a plurality of point light sources, onto a plurality of locations corresponding to detected locations of the objects on a windshield of the vehicle such that the plurality of light patterns are superimposed on the objects to indicate the warnings and the severity of the warnings,
   wherein the display module is configured to selectively illuminate the plurality of point light sources in a first mode, a second mode, a third mode, a fourth mode, a fifth mode, and a sixth mode,
   wherein the first mode illuminates the plurality of light patterns corresponding to the lane departure warning, the second mode illuminates the plurality of light patterns corresponding to the blind spot warning, the third mode illuminates the plurality of light patterns corresponding to the following distance indicator, the front distance indicator, and/or the backup distance indicator, the fourth mode illuminates the plurality of light patterns corresponding to the head-on threat warning, the fifth mode illuminates the plurality of light patterns corresponding to the lateral threat warning, and the sixth mode illuminates the plurality of light patterns corresponding to a plurality of the first through fifth modes,
   wherein the display module is capable of displaying the first through fifth modes and indicate the severity of the corresponding warnings simultaneously, and
   wherein the display module determines which of the plurality of point light sources to illuminate based on one or more of the warnings delivered from the display control module.

2. The vehicle head-up display device of claim 1, wherein the one or more warnings may be selectively enabled or disabled by a driver of the vehicle.

3. The vehicle head-up display device of claim 1, wherein the one or more warnings may be based on signals indicating at least one of a vehicle speed, a vehicle acceleration, a pedal position, a turn signal activation, an existence of a second vehicle or lane marker, a speed of a second vehicle, or a position of a second vehicle or lane marker.

4. The vehicle head-up display of claim 1, wherein the plurality of point light sources are light emitting diodes.

5. The vehicle head-up display of claim 4, wherein the light emitting diodes generate red colored light, yellow colored light, and green colored light.

6. The vehicle head-up display of claim 1, wherein the detecting module is configured to detect at least one of a second vehicle or a lane marker.

7. The vehicle head-up display of claim 6, wherein the detecting module receives signals from at least one of a radar, lidar, camera, and a vehicle-to-vehicle communication device to determine presence, speed, and position, of the at least one of the second vehicle or lane marker.

8. The vehicle head-up display of claim 1, wherein the display module is provided on a surface of an instrument panel of the vehicle, opposed to the windshield of the vehicle.

9. The vehicle head-up display of claim 1, wherein the lane departure warning and the blind spot warning are displayed on the windshield by illuminating the plurality of point light sources projecting the light patterns that overlay or are adjacent to a lane marker.

10. The vehicle head-up display of claim 9, wherein the lane departure warning only displays the plurality of point light sources that project the light patterns overlaying the lane marker over which a portion of the vehicle is crossing are illuminated.

11. The vehicle head-up display of claim 10, wherein the lane departure warning is displayed by repeatedly illuminating the plurality of point light sources such that the light patterns overlaying the lane marker blink.

12. The vehicle head-up display of claim 9, wherein the blind spot warning only displays the plurality of point light sources that project the light patterns adjacent to the lane marker on a side of the vehicle where a second object is passing.

13. The vehicle head-up display of claim 12, wherein the blind spot warning is displayed by illuminating the plurality of point light sources in sequence, from closest to an instrument panel to furthest from the instrument panel.

14. The vehicle head-up display of claim 1, wherein the front distance indicator, the following distance indicator, and/or the backup distance indicator is displayed on the windshield by illuminating the plurality of point light sources projecting the light patterns along a straight, vertical line close to the instrument panel.

15. The vehicle head-up display of claim 14, wherein the front distance indicator, the following distance indicator and/or the backup distance indicator is displayed by the plurality of point light sources into a first group of light sources, a second group of light sources, and a third group of light sources.

16. The vehicle head-up display of claim 15, wherein the first group of light sources is closest to an instrument panel and colored green to indicate an appropriate following distance and/or an appropriate backup distance, the second group of light sources is further from the instrument panel, adjacent to the first group of light sources, and colored yellow to indicate a close following distance and/or a close backup distance, and the third group of light sources is farthest from the instrument panel, adjacent to the second group of light sources, and colored red to indicate a dangerous following distance and/or a dangerous backup distance.

17. The vehicle head-up display of claim 1, wherein the head-on threat warning is displayed on the windshield by illuminating the plurality of point light sources projecting the light patterns that overlay a second object outside the vehicle.

18. The vehicle head-up display of claim 17, wherein the head-on threat warning is displayed by repeatedly illuminating the plurality of point light sources such that light patterns blink indicating that a head-on vehicle crash is likely to imminently occur.

19. The vehicle head-up display of claim 1, wherein the lateral threat warning is displayed on the windshield by illuminating the plurality of point light sources projecting the light patterns that are displayed for both the head-on threat warning and the lane departure warning.

20. A vehicle head-up display device, comprising:
a detecting module configured to receive, from a sensor device and/or a vehicle-to-vehicle communication device, detected signals related to objects appearing outside of a vehicle having the head-up display device;
an information module configured to obtain vehicle information from a plurality of sensors and controllers;
a display control module receiving signals from a plurality of sources comprising the detecting module and the information module, and determining one or more warnings and a severity of the one or more warnings based on the signals, wherein the warnings include at least one of a lane departure warning, a blind spot warning, a following distance indicator, a front distance indicator, a backup distance indicator, a head-on threat warning, or a lateral threat warning corresponding to the detected signals; and
a display module having a plurality of light sources comprising light emitting diodes that selectively project based on the severity of the one or more warnings, a plurality of light patterns, in the form of information dots, onto a plurality of locations corresponding to detected locations of the objects on a windshield of the vehicle such that the plurality of light patterns are superimposed on the objects to indicate the warnings and the severity of the warnings,
wherein the display module is configured to selectively illuminate the plurality of light sources in a first mode, a second mode, a third mode, a fourth mode, a fifth mode, and a sixth mode,
wherein the first mode illuminates the plurality of light patterns corresponding to the lane departure warning and blind spot warning, the second mode illuminates the plurality of light patterns corresponding to the following distance indicator, the front distance indicator, and/or the backup distance indicator, the third mode illuminates the plurality of light patterns corresponding to the head-on threat warning, the fourth mode illuminates the plurality of light patterns corresponding to the lateral threat warning, and the fifth mode illuminates the plurality of light patterns corresponding to a plurality of the first through fourth modes,
wherein the display module is capable of displaying the first through fourth modes and indicate the severity of the corresponding warnings simultaneously, and
wherein the display module determines which of the plurality of light sources to illuminate based on one or more of the warnings delivered from the display control module.

21. The vehicle head-up display device of claim 20, wherein the one or more warnings may be selectively enabled or disabled by a driver of the vehicle.

22. The vehicle head-up display device of claim 20, wherein the one or more warnings may be based on signals indicating at least one of a vehicle speed, a vehicle acceleration, a pedal position, a turn signal activation, an existence of a second vehicle or lane marker, a speed of a second vehicle, or a position of a second vehicle or lane marker.

23. The vehicle head-up display device of claim 20, wherein the light emitting diodes generate red colored light, yellow colored light, and green colored light.

* * * * *